Nov. 5, 1957 M. BECHIK Re. 24,386

HANDLES FOR MATTRESSES AND THE LIKE

Original Filed Feb. 4, 1955

INVENTOR.
Michael Bechik
BY
Merchant & Merchant
ATTORNEYS

United States Patent Office

Re. 24,386
Reissued Nov. 5, 1957

24,386

HANDLES FOR MATTRESSES AND THE LIKE

Michael Bechik, St. Paul, Minn., assignor to Bechik Products, Inc., St. Paul, Minn., a corporation of Minnesota Original No. 2,786,216, dated March 26, 1957, Serial No. 486,076, February 4, 1955. Application for reissue May 7, 1957, Serial No. 658,906

4 Claims. (Cl. 5—345)

Matter enclosed in heavy brackets [ ] appears in the original patent but forms no part of this reissue specification; matter printed in italics indicates the additions made by reissue.

My invention relates to handles for mattresses and the like and has for its primary object the provision of a device of the class described which is relatively inexpensive to produce and which is strong and durable.

A still further object of my invention is the provision of a device of the class described which is quick and easy to install upon the wall of a mattress or the like, which is light in weight, and which may be used without unduly distorting or stretching the wall of a mattress.

A still further object of my invention is the provision of a novel hand engaging handle element which may be used in connection with a flexible resilient bar secured to the inside wall of the mattress, and in further combination with novel means for attaching and detaching said handle means to the bar.

The above and still further objects of my invention will become apparent from the following detailed specification, appended claims, and attached drawings.

Referring to the drawings, wherein like characters are indicated by like parts throughout the several views.

Figure 1:
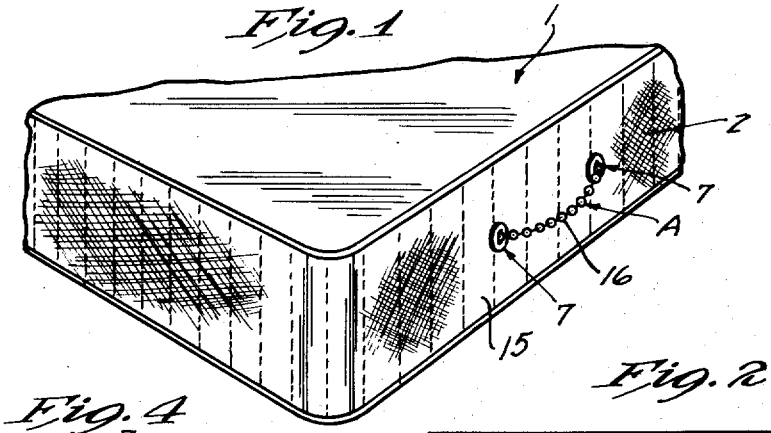
Fig. 1 is a fragmentary perspective view of a mattress to the side wall of which my novel handle is attached.

Referring with greater particularity to the drawings, the numeral 1 indicates in its entirely a conventional mattress the side wall of which is identified by the numeral 2. A flexible resilient bar 3, preferably of spring steel, is provided with spaced openings 4 one each adjacent its opposite ends 5 and 6. As shown, spaced grommets 7 extend through the wall 2 of the mattress 1 and through the openings 4 in the opposite end portions of the bar 3 and are suitably crimped on their outer and inner ends, as identified by the numerals 8 and 9, respectively, whereby to securely retain the bar 3 in tight engagement with the inner surface 10 of the wall 2.

Figure 3:
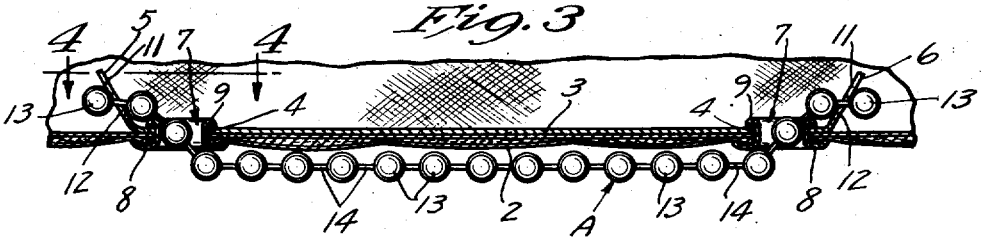
Fig. 3 is an enlarged view partly in section and partly in top plan as seen substantially from the line 3—3 of Fig. 2.

Preferably and as shown, the openings 4 through the bar 3 are in spaced relation to the opposite ends 5 and 6 thereof, and the outer ends 5 and 6 are bent inwardly at acute angles to the wall 2 and diverge from each other, as particularly shown in Fig. 3. As there shown, the bar 3 and wall 2 are in a normal unflexed and undistorted condition, the former tending to maintain the two in this relationship.

Figure 4:
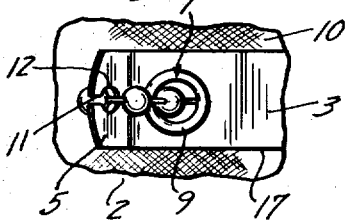
Fig. 4 is a fragmentary view in rear elevation as seen from the line 4—4 of Fig. 3.

As shown particularly in Figs. 3 and 4, the outer end portions 5 and 6 of the bar 3 are provided with longitudinally extending, [open-ended] *slots or* notches 11 which terminate longitudinally outwardly of the adjacent openings 4 and which preferably are enlarged, as indicated at 12, at their inner ends. A conventional ball chain A comprising spaced hollow spheres or balls 13 and longitudinally extended connecting pins 14 engages the outer surface 15 of the wall 2 and has its opposite ends [etxending] *extending* through the grommets. As shown, the balls 13 are of diameters greater than the reduced outer ends of the notches 11 and also greater than the enlarged inner ends 12 thereof. On the other hand, the connecting pins 14 are of a width less than the notches 11. This arrangement enables the pins 14 adjacent the last ball 13 on each end to be received within the slots on the end portions 5 and 6 of the ball 3.

Figure 2:
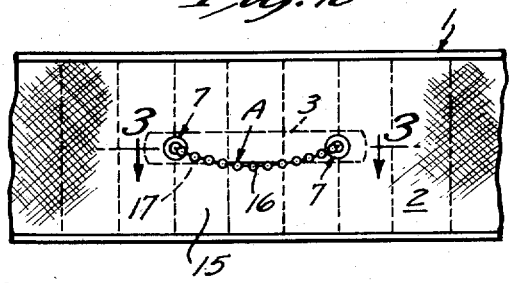
Fig. 2 is a fragmentary view in side elevation of the side wall of the mattress of Fig. 1.

Also preferably and as shown, the normal distance between the outer ends of the notches 11 is greater than the distance between the pins 14 received within said notches, whereby flexing of the bar 3 is required to permit attachment and detachment of the chain A in said notches. This arrangement also insures against accidental removal of the opposite ends of the chain A from the notches 11. Also preferably and as shown, the normal distance between the inner enlarged ends 12 of the notches 11 is less than the distance between the links 14 received within said notches whereby, as shown particularly in Figs. 1 and 2, the chain A is permitted to sag slightly between the grommets 7 whereby to permit initial insertion of a portion of the hand between the chain A and the back bar 3. In practice I have found it desirable to have this sag limited to an extent where inward flexing or bowing of the back bar 3 is required in order to insert the complete hand of the operator between the chain A and the back bar 3. Specifically the extent of this sag is such that the intermediate portion 16 of the chain A is disposed at a level substantially in a plane with the lower longitudinal edge 17 of the bar 3 when the elements are in the unused positions of Figs. 1 and 2.

My invention has been thoroughly tested and found to be completely satisfactory for the accomplishment of the above objects, and while I have disclosed a preferred embodiment thereof, it should be obvious that same is capable of modification without departure from the scope of the appended claims.

What I claim is:

1. In combination with a flexible mattress wall having inner and outer surfaces, a handle comprising an elongated flexible resilient bar disposed in a plane adjacent the inner surface of the wall, said bar having a pair of longitudinally spaced openings each longitudinally inwardly spaced from the respective opposite ends of the bar, a pair of longitudinally spaced grommets each extending through the mattress wall and through a respective opening in said bar to secure said bar in said plane against the inner surface of the mattress wall, each opposite end portion of said bar intermediate each opening and the respective end of the bar being bent inwardly away from the inner surface of the mattress wall and disposed in diverging relationship longitudinally away from each other, a substantially non-extensible flexible chain including spaced balls connected together by longitudinally extending pins, said chain being disposed against the outer surface of the mattress wall with the opposite ends thereof extending through said grommets, means within the mattress wall detachably anchoring the opposite ends of said chain to the bar, said means including an open-ended longitudinally extending notch in each of said end portions of the bar, each of said notches being of a width less than the diameters of said balls and greater than the width of said pins, said notches each receiving a pin of said chain to position the chain against the outer surface of the mattress wall, the normal longitudinal distance between the open ends of said notches being greater than the longitudinal distance between the pins received in the respective notches, whereby longitudinal flexing of the bar is required to permit attachment and detachment of the opposite ends of the chain to the bar.

2. The structure defined in claim 1 wherein said notches each terminate in enlarged portions longitudinally inwardly spaced from the open ends of each notch, the normal longitudinal distance between said enlarged portions of said notches being less than the longitudinal distance between the respective pins received in the notches, whereby the chain is permitted to normally sag slightly intermediate the grommets permitting the initial insertion of a portion of the hand between the chain and outer surface of the mattress wall.

3. The structure defined in claim 2 in which the normal sag in said chain exteriorly of said mattress wall is such that the intermediate portion thereof is disposed at a level substantially in a plane with the lower longitudinal edge of said bar.

*4. In combination with a flexible mattress wall having inner and outer surfaces, a handle comprising an elongated flexible resilient bar element disposed in a plane adjacent the inner surface of the wall, said bar element having a*

*pair of longitudinally spaced openings each longitudinally inwardly spaced from the respective opposite ends of said bar element, a pair of longitudinally spaced grommets each extending through the mattress wall and through a respective opening in said bar element to secure said bar element in said plane against the inner surface of the mattress wall, a substantially non-extensible flexible handle element disposed against the outer surface of said mattress wall with the opposite end portions thereof extending through said grommets, the opposite ends of one of said elements having slots therein, the opposite ends of the other of said elements comprising reduced portions receivable in said slots, the relative lengths of said elements being such that flexing of the bar element is required to attach said handle element thereto and detach the same therefrom.*

References Cited in the file of this patent or the original patent

UNITED STATES PATENTS

| | | |
|---|---|---|
| 1,721,338 | Gagnon | July 16, 1929 |
| 2,248,328 | Bechik | July 8, 1941 |